United States Patent [19]
Zahid

[11] 4,069,844
[45] Jan. 24, 1978

[54] PRESSURE DAMPENER DEVICE

[75] Inventor: Abduz Zahid, Los Angeles, Calif.

[73] Assignee: Greer Hydraulics, Inc., Los Angeles, Calif.

[21] Appl. No.: 727,467

[22] Filed: Sept. 28, 1976

[51] Int. Cl.² ............................................. F16L 55/00
[52] U.S. Cl. .................................................... 138/30
[58] Field of Search ................................... 138/26, 30

[56] References Cited
U.S. PATENT DOCUMENTS

| 2,191,490 | 2/1940 | Mitterer | 138/26 |
|---|---|---|---|
| 2,243,592 | 5/1941 | Wolf | 138/26 X |
| 3,140,729 | 7/1964 | Mercier | 138/30 |
| 3,333,600 | 8/1967 | Mercier | 138/30 X |
| 3,379,215 | 4/1968 | Greer et al. | 138/30 |
| 3,782,418 | 1/1974 | Zahid | 138/30 X |
| 3,868,972 | 3/1975 | Zirps | 138/30 |

Primary Examiner—Richard E. Aegerter
Assistant Examiner—James E. Bryant, III
Attorney, Agent, or Firm—Arthur B. Colvin

[57] ABSTRACT

The present invention is directed to an improved dampener device of the type employed to dampen or reduce the amplitude of pulses in hydraulic systems. The device is characterized by increased versatility and simplicity of design, leading to low manufacturing cost.

3 Claims, 3 Drawing Figures

: 1

PRESSURE DAMPENER DEVICE

BACKGROUND

The present invention is in the field of pulse dampener devices. As conducive to an understanding of the invention it may be noted that in many hydraulic systems, and particularly systems utilizing reciprocating pumps, such as piston pumps, pulses are generated and transmitted throughout the system. In view of the compressibility of the oil in the system, the shocks on various system components are often sufficiently severe to result in damage or rupture of elements of the system.

The problem is compounded by harmonic effects which may magnify the shocks generated throughout the system.

THE PRIOR ART

In order to reduce the shock effects resulting from pulses in hydraulic systems, it is conventional practice to introduce, at spaced intervals along the pressure lines of a hydraulic system, one or more pulse dampening devices. Such devices may comprise a pressure vessel or casing divided into two chambers by a movable boundary, such as a bladder. One side of the boundary is connected to a gas charging valve whereby gas under pressure is introduced at one side of the bladder. The opposite side of the bladder is connected to the hydraulic line, whereby the bladder and contained gas may be compressed and pulse energy absorbed by the compression effects on the contained gas.

Heretofore dampening devices of the type described, as exemplified by the apparatus disclosed in U.S. Pat. No. 3,782,418, have embodied movable poppet valves or like expendients which shift between oil admitting and sealing positions of the pressure vessel responsive to increases and decreases in the oil pressure. Advanced examples of such dampener devices as exemplified in the above noted United States patent include, in addition, means for guiding the oil in the desired path within the dampener devices for purposes of minimizing impedance to flow passage across the dampener device, without loss of pulse dampening effect.

Devices of the sort noted have been expensive to manufacture, involve a multiplicity of moving parts, and have included complex machined, cast, forged or otherwise formed elements. Since parameters, such as flow aperture size, required for maximum efficiency vary from application to application, depending upon such factors as the viscosity of the hydraulic fluid used, pressure, pulse frequency, etc., it has been necessary to fabricate the complex parts of dampener devices heretofore known to fit each particular set of circumstances.

Thus, the manufacturer must provide and the wholesaler must stock a wide variety of dampener units, despite the fact that certain of the elements of dampeners, notably the pressure vessel and the bladder assemblies, may be suitably employed without significant variation for a wide range of applications.

SUMMARY OF THE INVENTION

The present invention may be summarized as directed to an improved, ubiquitous pressure pulse dampener device of simplified construction, requiring a minimum number of parts, and employing, in particular, a readily substituted insert member, which insert member contains the flow governing apertures which enable the unit to be accomodated to a specific hydraulic installation.

In accordance with the invention, a hydraulic dampener device may be modified in accordance with the desired operating characteristics by simply removing a sealing plug member and substituting for an insert member having a first set of flow characteristics a second insert member having a second set of flow characteristics. The manufacturer is thus enabled, for a given capacity of dampener device, to manufacture a standardized shell or vessel assembly and a series of different, readily replaceable insert members, thereby effecting substantial economies.

In addition to the adaptability of the device, the overall construction is substantially simplified, eliminating the need for providing complex castings and machining operations.

Accordingly, it is an object of the invention to provide an improved pressure pulse dampening device.

Still a further object of the invention is the provision of a dampening device of the type described which includes a standardized pressure vessel having readily replaceable inserts, the inserts being constructed and arranged to correspond to selected ranges of operating parameters, whereby variation from one such range to another may be readily accomplished by merely substituting one insert for another.

To attain these objects and such other objects as may appear herein or be hereinafter pointed out, reference is made to the accompanying drawings, forming a part hereof, in which.

Figure 1:
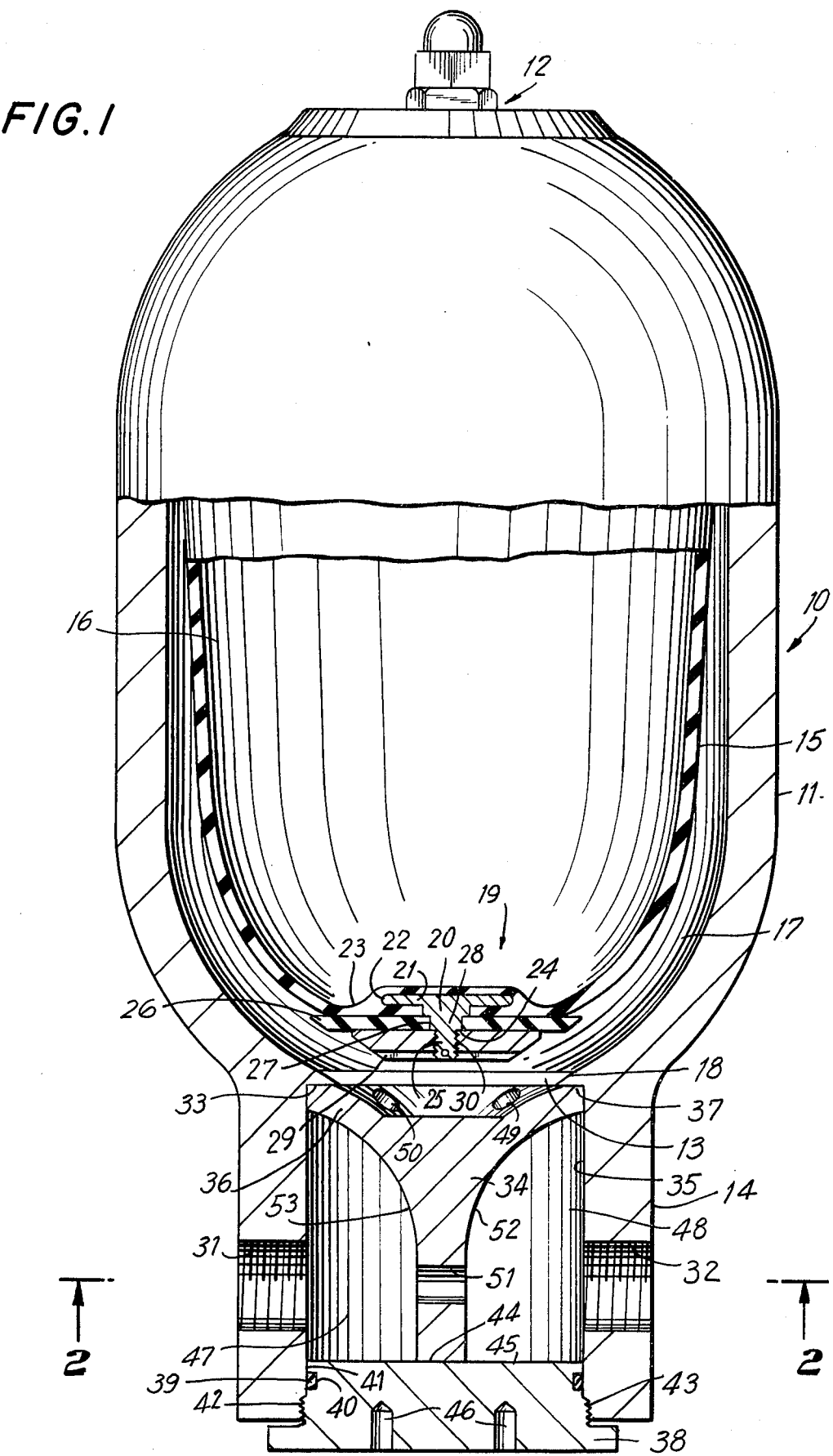
FIG. 1 is a vertical sectional view of a dampener device in accordance with the invention.

Referring now to the drawings, there is shown at 10 a pulse dampener device which comprises a rigid pressure vessel 11 having a gas charging valve 12 at one end thereof, and an oil port 13 adjacent the other end. The pressure vessel 11 preferably includes a depending cylindrical skirt 14 at the lower end thereof, the skirt being desirably formed integrally with the pressure vessel 11.

A partition member, such as a bladder 15, of elastomeric, distensible material, is supported adjacent its upper rim (not shown) in a conventional manner, in surrounding relation of the gas port 12. The bladder 15, in effect, divides the interior of the pressure vessel 11 into two chambers, namely chamber 16 communicating with the gas charging valve 12, and chamber 17 communicating with the oil port 13.

Preferably the oil port 13 includes a circumferential beveled valve seat 18 and the bladder includes a self-centering valve assembly 19 adapted, upon expansion of the bladder (as when the pressure in the chamber 16 exceeds the pressure in the chamber 17) to define a seal with the valve seat 18. The valve assembly 19 preferably includes a metal support member 20 having a head portion 21 which may be molded in situ in a recess 22 disposed at the base 23 of the bladder.

The support member 20 includes a stop shoulder 24 adjoining a threaded shank 25. A buffer washer 26, which is preferably formed of an elastomeric material of harder durometer than the material of the bladder 15, is provided with a central aperture 27, sleeved over a stepped shank portion 28 of the support member 30. A locking disk 29, having a threaded interior aperture 20 is mounted over the threaded portion 25 of the support member, clampingly sandwiching the washer 26 against the lower end 23 of the bladder.

It will be understood that upon downward movement of the valve assembly 19, a sealing connection is effected between the valve assembly 19 and the seat 18 surrounding the port.

The above described arrangement is essentially conventional and functions to prevent the bladder from being extruded outwardly through the oil port, with consequent damage thereto.

The skirt 14 includes a pair of internally threaded oil flow passages 31, 32 adapted to be connected to the opposed termini of the oil conduit of a hydraulic system whereby the dampening device may be interposed in the conduit in such manner that oil must flow through the dampener device in order to pass from one to the other of the passages 31, 32.

The skirt portion 14 is provided with an interior, outwardly directed annular shoulder 33. An insert member 34 is inserted within the interior bore 35 of the skirt. The insert member 34 includes an enlarged head portion 36 having an upwardly facing annular shoulder 37 adpated to engage against the downwardly facing shoulder 33 of the skirt. It will thus be apparent that upward movement of the insert into the skirt is limited by engagement of the respective sholders 33 and 37, and that the head of the insert provides a further means for preventing extrusion of the bladder.

The insert 34 is maintained in position by a locking plug 38 mounted in a threaded depending open mouth portion defined by the lowermost edge of the skirt. The plug 38 is provided with a sealing O-ring 39 disposed in groove 40, the O-ring forming a tight seal with interior wall portion 41 of the skirt.

The plug 38 includes an external thread section 42 complemental to the internal thread section 43 formed on the interior of the bore 35 of the skirt. It will thus be apparent that by threading the plug 38 into the skirt 14, the under surface 44 of the insert will abut against the face 45 of the plug, whereby the insert will be tightly biased or clamped between the plug 38 and the annular shoulder 33. The plug 38 is preferably provided with spanner recesses 46 for reception of a spanner wrench member.

When the plug 38 is clamped into position as described, it will be apparent that the central partition 34 of the insert will divide the interior of the skirt into two flow passages 47 and 48, which passages are directed generally axially of the skirt. If desired, and for ease of installation, the insert and bore may include complemental locator means (not shown) for assuring that the partition 34 is perpendicular to the axis of the oil flow passages 31, 32.

Figure 2:
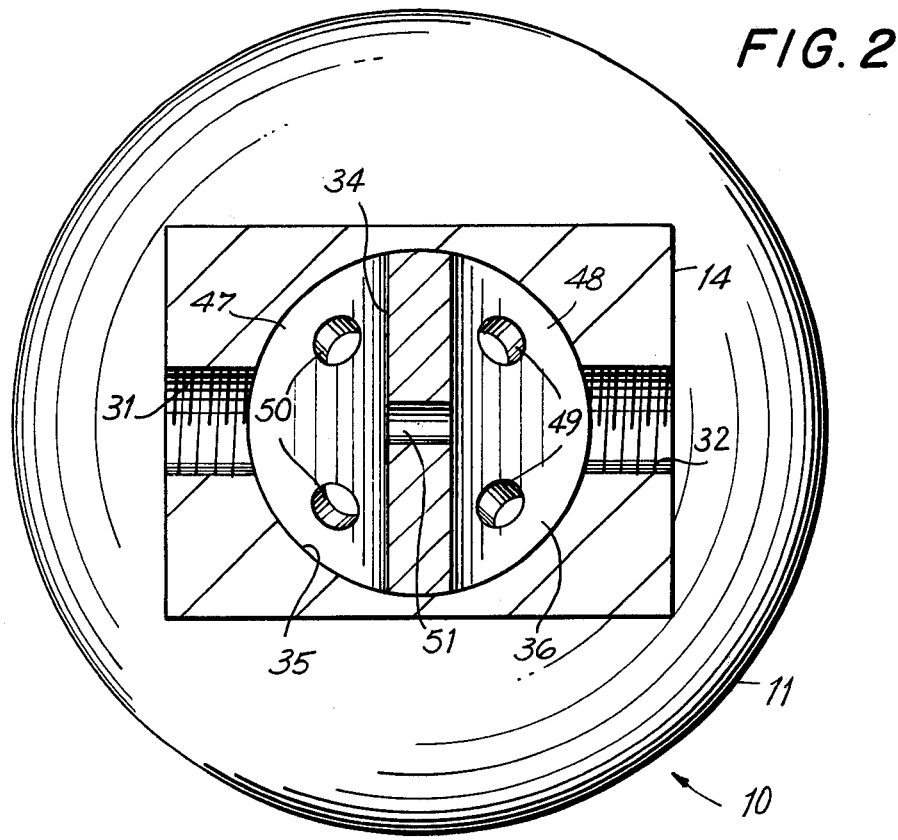
FIG. 2 is a section taken on the line 2—2 of FIG. 1.
Figure 3:
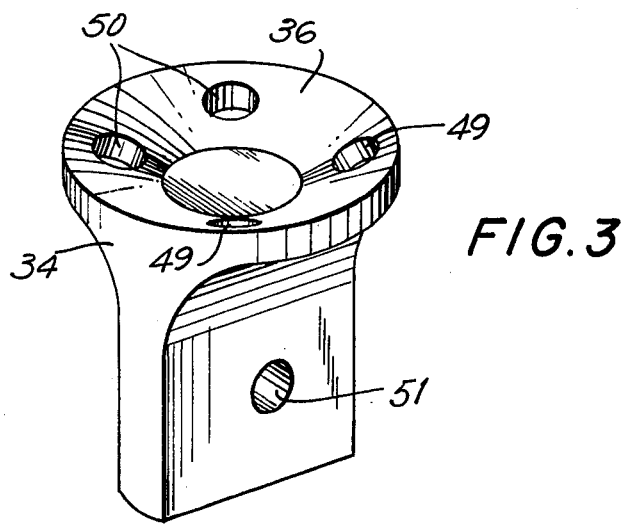
FIG. 3 is a perspective view of an insert member in accordance with the invention.

As best seen from an inspection of FIGS. 2 and 3, the insert 34 is provided in the head portion 36 with a plurality of through-going apertures 49, 49, 50, 50, which apertures link the oil port 13 with the flow passages 47 and 48, respectively. The apertures 49, 49 and 50, 50 preferably converge in an inward direction when viewed from the aspect of the skirt toward the interior of the vessel.

The partition 34 includes, in addition, a by-pass aperture 51 coaxially aligned with the oil passages 31 and 32.

The operation of the device will be apparent from the preceding description.

The chamber 16 is precharged with gas under pressure through the gas charging valve 12. The charge will cause the bladder to expand, forcing the valve assembly 19 downwardly into engagement with the valve seat 18. The dampener device is interposed in an oil or hydraulic line, and when the oil pressure is sufficiently great, the valve 19 will be lifted from its seat, causing the bladder 15 and the gas charged therein to be compressed by the oil, the pulses in the oil system being dampened by transfer of energy into the compressed gas. The principal flow patter of oil through the system involves an upward movement of oil along one of the passages 47 or 48 and a downward movement along the other said passage, flow across the head 36 of the insert 34 being permitted by the apertures 49 and 50.

The impedance of the device and consequent frictional losses are reduced in the instant device as contracted with apparatus heretofore known by the improved flow pattern achieved through the use of the converting apertures 49, 50. Additionally, and as indicated in the above cited United States patent, the provision of a by-pass or jet flow aperture 51 further reduces turbulence in the flow pattern be producing a laminar jet stream directly between the openings 31, 32.

Where the device is to be used with a hydraulic installation having materially different operating parameters, e. g., lower volume and higher pressure, etc., it is desirable, to achieve optimal results, that the dimensional characteristics of the apertures 49, 50 and 51 be tailored to the specific characteristics of the hydraulic system. In the instant apparatus, such modification may be readily effected by removing plug 38, permitting the insert 34 to be slid outwardly through the skirt, and replacing the insert with a further insert having identical external dimensions but having apertures modified as desired for the intended end use. Preferably, the insert includes curved surfaces 52, 53, providing additional streamlining of the flow pattern.

From the above it will be appreciated that there is provided in accordance with the present invention an improved pulse dampener device for use in hydraulic systems, the device being of simplified construction and being susceptible of ready conversion or adaptation, as required, to permit the same to be accommodated to various hydraulic applications.

Having thus described the invention and illustrated its use, what is claimed as new and is desired to be secured by Letters Patent is:

1. A low turbulence pressure pulse dampener device comprising a rigid pressure vessel including a gas charging port at one end and an oil port at the other end, a bladder assembly disposed within said vessel and dividing the same into two chambers in communication, respectively, with said gas port and said oil port, valve means carried by said bladder assembly disposed in opposed relation to said oil port and positioned to be shifted into sealing and unsealing relation to said port responsive, respectively, to expansion and contraction of said bladder, a hollow cylindrical skirt portion surrounding and in coaxial alignment with said oil port, said skirt having a depending open mouth portion in spaced relation to said port, a threaded portion adjacent said mouth portion and an annular shoulder surrounding said port and facing said mouth portion, a pair of diametrically opposed, coaxially aligned oil passages formed in said skirt, the common axis of said passages being normal to the central axis of said oil port, an insert member disposed within said skirt and including a head portion engaged against said shoulder, a depending partition portion interposed between and normal to the axis of said oil passages, said partition dividing said skirt into first and second flow passages directed axially of said skirt, said insert including an under surface portion facing said open mouth, first and second aperture means formed in said head portion connecting said first and secong passages, respectively, with said oil port, a by-pass aperture formed in said partition, said by-pass aperture being aligned with the common axis of said oil passages, and a retainer plug memeber including an upper face portion directed toward said port, said plug member including an external threaded peripheral portion threadedly engaged with said threaded portion of said skirt to seal said mouth portion, said upper face portion of said plug member being disposed in clamping engagement with said under surface of said insert member thereby to support said insert member between said shoulder and said plug, said plug forming the sole means supporting said insert member in said skirt, whereby a second insert member may be substituted for said insert member by removing said plug.

2. Apparatus in accordance with claim 1 wherein said first and second aperture means are directed in converging relation when viewed in the direction of flow from said skirt into said pressure vessel.

3. Apparatus in accordance with claim 2 wherein said oil port includes a beveled valve seat portion and the surface of said head portion directed toward said pressure vessel includes bevel portions defining a continuation of said valve seat portion of said oil port.

* * * * *